Aug. 18, 1936.  R. B. BOURNE  2,051,515
SOUND ATTENUATING DEVICE
Filed Oct. 7, 1935  3 Sheets-Sheet 1
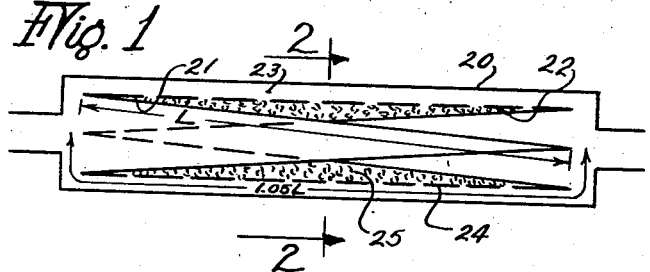
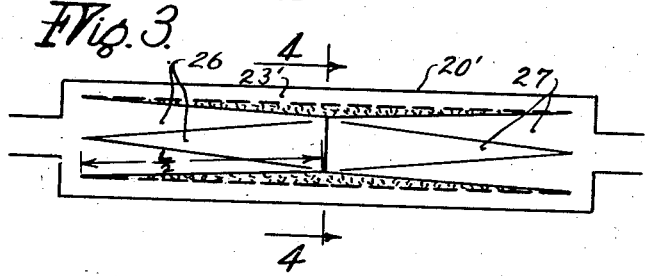
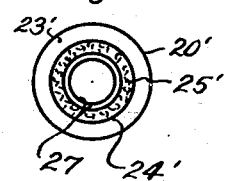
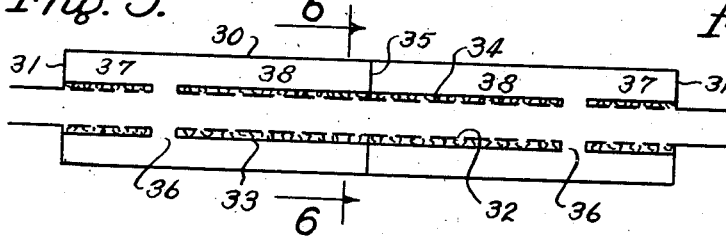
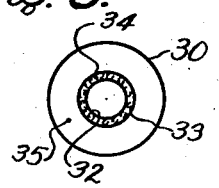
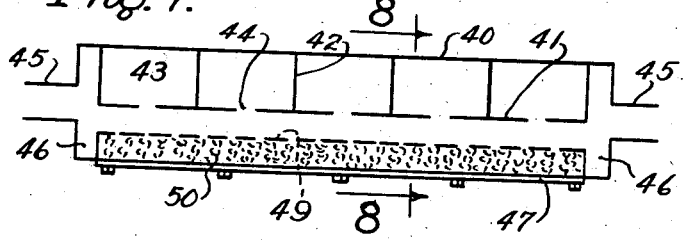
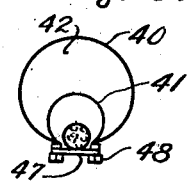
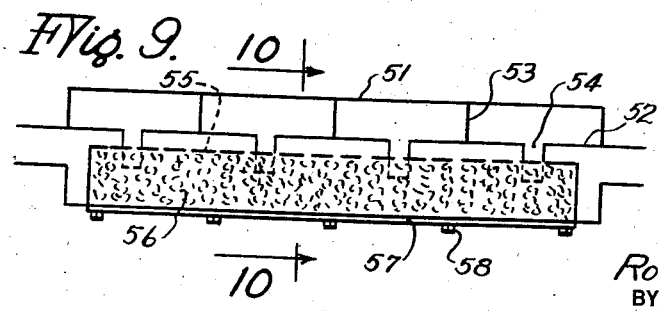
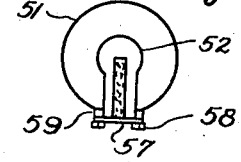
INVENTOR
ROLAND B. BOURNE
BY Chapin + Neal
ATTORNEYS

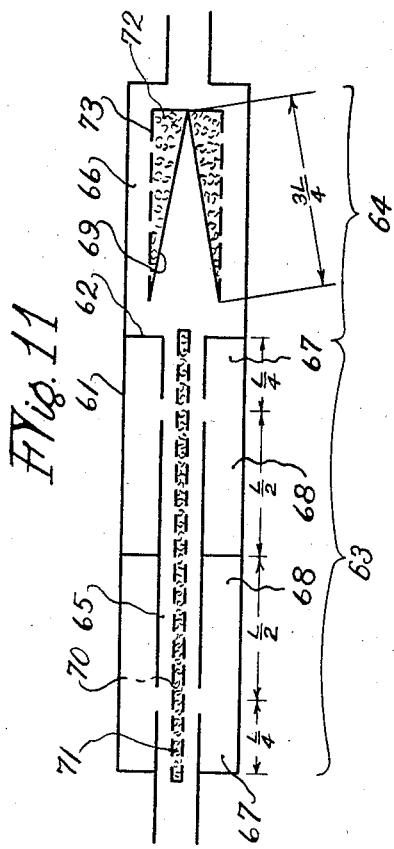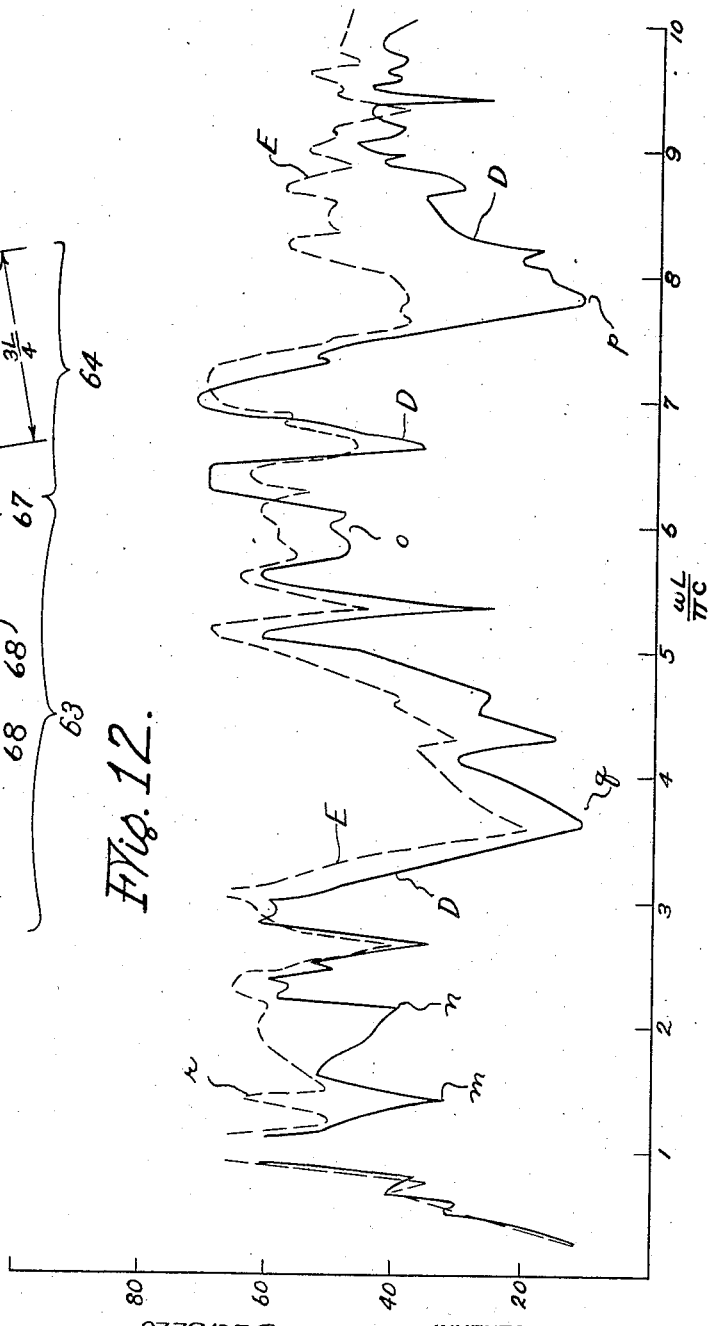

Aug. 18, 1936.  R. B. BOURNE  2,051,515
SOUND ATTENUATING DEVICE
Filed Oct. 7, 1935  3 Sheets-Sheet 3
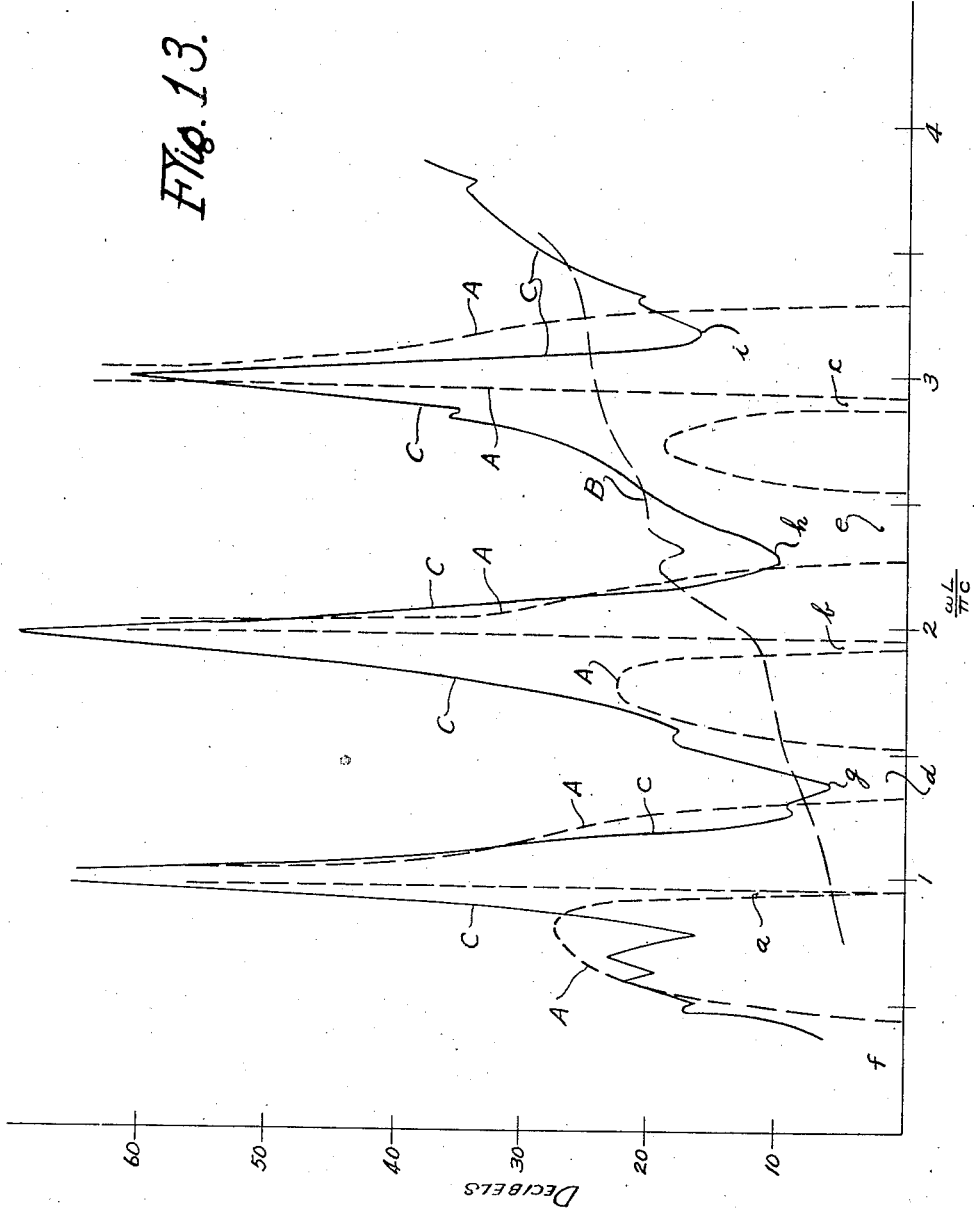
INVENTOR
ROLAND B. BOURNE
BY
Chapin + Neal
ATTORNEYS Patented Aug. 18, 1936

2,051,515

UNITED STATES PATENT OFFICE 2,051,515

SOUND ATTENUATING DEVICE

Roland B. Bourne, Hartford, Conn., assignor to The Maxim Silencer Company, Hartford, Conn., a corporation of Connecticut Application October 7, 1935, Serial No. 43,916

14 Claims. (Cl. 181—0.5)

In a prior application filed by me October 19, 1931, Serial No. 569,711, I have described a sound attenuating device in which certain novel effects were obtained by placing dissipative material in the main sound channel of the device between successive sidebranches. I have now found that similarly positioned dissipative material has novel and unexpected results when employed in an acoustic wave filter employing recurrent sidebranch elements, the material acting upon the filter in a manner wholly different from that which it would were it to be added in series to the main channel after the filter structure. In the latter case the effect of the dissipative material would be to attenuate the higher frequencies, the attenuation offered becoming progressively greater the higher the frequency; and the overall attenuation of the composite structure would be the additive effects of the filter and of the dissipative elements.

A recurrent wave filter, as is well recognized in the art, employs a plurality of identical sidebranch chambers spaced along a main sound conducting channel and acoustically coupled to it at intervals bearing a definite relation to the physical dimensions of the sidebranches. Unless this relationship be observed the several sidebranches act individually instead of as a unit. By the very fact of this regularity of relationship, however, the recurrent wave filter is prone to localized lowering of its calculated attenuation in the neighborhood of certain frequencies; and I have found that this effect is due to what I may term series resonance, or a tendency of the main channel to resonate to particular frequencies having a relation to its own physical dimensions. I have found that when dissipative material is introduced into the main channel this series resonance phenomenon can be reduced to such a degree that it is negligible, and that dips in the attenuation curve may actually be converted into peaks where the effect of series resonance has been to mask the attenuating effect of certain elements in the filter structure.

It is one object of the present invention to improve the structure of recurrent wave filters by eliminating the effects of series resonance through the action of dissipative material introduced into the main sound conducting channel. A further object is to improve the construction of recurrent wave filters by incorporating therewith dissipative material along the main channel in combination with sidebranches of the linear type made in conical form with the large end of the conical sidebranch acoustically coupled to the sound conducting channel. The present application is a continuation in part of my prior application Serial No. 723,085, filed April 30, 1934, in which many forms of such conical sidebranches are described. Another object is to provide a construction of sound attenuating devices whereby dissipative material introduced into the main conducting channel can be removed therefrom readily for purposes of cleaning or inspection. Additional objects will appear from the following description and claims.

Referring to the drawings,

Fig. 1 is a diagrammatic view showing the invention applied to a recurrent wave filter employing sidebranches of cross sectional area varying as a function of their length measured from their points of coupling to the main channel;

Fig. 2 is a section on line 2—2 of Fig. 1;

Fig. 3 is a diagrammatic view showing the invention applied to a recurrent wave filter employing conical sidebranches reflexed in accordance with my copending application Serial No. 35,428, filed August 9, 1935;

Fig. 4 is a section on line 4—4 of Fig. 3;

Fig. 5 is a diagrammatic view showing the invention applied to a recurrent wave filter of the general type shown in my Patent 1,910,672, May 23, 1933;

Fig. 6 is a section on line 6—6 of Fig. 5;

Fig. 7 is a diagrammatic longitudinal section through a recurrent wave filter showing a construction providing for the ready removal for cleaning or inspection of dissipative material distributed along the main sound conducting channel;

Fig. 8 is a section on line 8—8 of Fig. 7;

Fig. 9 is a view similar to Fig. 7 showing a modification;

Fig. 10 is a section on line 10—10 of Fig. 9;

Fig. 11 is a diagrammatic view showing the invention applied to a type of recurrent wave filter of the general type shown in my Patent 1,910,672, in combination with a conical sidebranch, and illustrating a different manner of introducing the dissipative material into the main sound conducting channel;

Fig. 12 is a graph showing the attenuation vs. frequency characteristics of the recurrent wave filter shown in Fig. 11; and Fig. 13 is a graph showing the attenuation vs. frequency characteristics of the recurrent wave filter shown in Figs. 1 and 2.

In a recurrent wave filter there is an acoustic reaction between adjacent sidebranches via the main sound conducting channel. The presence of sound absorbing or dissipative material distributed along the main channel modifies the action of the filter in a manner which will be fully discussed below, and the equations generally used to predetermine the performance of such a filter no longer apply since these equations are derived upon the assumption that no dissipative losses due to sound absorption occur in the elements comprising the filter sections. The acoustical properties of the device are changed not only because the sound absorbing material offers attenuation to those sound waves passing directly through the main channel, which produces the recognized additive effect of dissipation increasing in effectiveness with frequency, but also because the presence of the dissipative material changes the interaction between the main channel and the sidebranches and to an even greater degree the interaction between the sidebranches themselves. Since the dissipative main channel is in series with adjacent sidebranches for sound frequencies involved in the action of the recurrent filter, it is readily seen that all of the sound absorbing material between adjacent sidebranches is effective in modifying this action. The magnitude of this effect depends upon the absorptive properties of the dissipative material used and upon its disposition and amount. The effect of the dissipative material is not merely additive, as would be expected were it to be placed in series with the filter, and is not confined to the previously recognized minor effects of introducing some attenuation into the theoretical pass bands, reducing the height of the attenuation peaks, and shifting slightly the frequency at which the attenuation peaks and pass bands occur. These known effects are of slight consequence and are generally disregarded in the design of recurrent filters. In general they have been considered as deleterious to the proper action of a recurrent filter. The effects with which the present invention concerns itself are of a quite different kind and occur quantitatively in a degree which would be unexpected from the previously known properties of dissipation. This will be clearer when the actual performance graphs of recurrent filters employing the present invention are considered after the structures of the various embodiments are described.

Figs. 1 and 2 show an embodiment of the invention similar to that of Figs. 10 and 11 of my copending application Serial No. 723,085 of which the present application is a continuation in part. It comprises a generally cylindrical casing 20, in which are suitably supported oppositely directed cones 21 and 22 with open bases. The two cones are mounted side by side as is best shown in Fig. 2, and are coupled to the main sound conducting channel 23 which extends from the ends of the casing annularly around the cones. Surrounding the cones is a cylindrical perforated member 24 extending from the base of one cone to the base of the other cone, the space between the cones and the perforated member being filled with sound absorbing material 25. This device is a two section acoustic wave filter having closed conical sidebranches of acoustic length L coupled to a main sound conducting channel of a length approximately equal to L but greater by a small amount due to the bending of the main channel from tubular to annular form.

Fig. 3 shows a similar embodiment of the invention and is the acoustic counterpart of Fig. 1, the only difference being that the conical sidebranches 26, 27 are reflexed as described in connection with Fig. 10 of my copending application Serial No. 35,428. The acoustic performance of both devices is substantially the same and any discussion of one may be said to apply equally well to the other. The only physical difference being the construction of the conical sidebranches, the remaining elements are designated by primed reference numerals.

I have found that for ordinary proportions of the parts the behaviour of these acoustic wave filters is best explained on the basis that the main channel is about five percent longer than the acoustic length of the cones. Neglecting dissipative losses entirely, the devices of Figs. 1 and 3 operate under the equation $$\cosh \Gamma = \cos 1.05 \frac{\omega L}{C} + \frac{S_2}{2S_1} \sin 1.05 \frac{\omega L}{C} \left( \cot \frac{\omega L}{C} - \frac{1}{\frac{\omega L}{C}} \right) \quad (1)$$

where $\Gamma$ = the constant of propagation, showing attenuation in napiers for real values of $\cosh \Gamma$. To convert from napiers to decibels it is only necessary to multiply by 8.686.
$L$ = the acoustic length of the sidebranch as indicated in the drawings.
$\omega = 2\pi f$.
$f$ = frequency of the sound wave.
$C$ = velocity of sound in the medium.
$S_2$ = the area of the base of the cone, and
$S_1$ = the cross sectional area of the main conducting channel.

A plot of Equation (1) is shown as curve A in Fig. 13 of the present drawings. This curve shows pairs of attenuation bands separated by very narrow pass bands $a$, $b$, $c$; each pair being separated from the next pair by wider pass bands $d$, $e$, and a low pass band $f$ below the first pair being also present. The narrow pass bands $a$, $b$, $c$, which may be very troublesome in practice if a substantial sound amplitude happens to occur within them, are due to the fact that the acoustic length of the main channel is slightly greater than that of the sidebranches. Equation (1) is of course an approximation due to the fact that dissipation due to gas viscosity is omitted, but the agreement with measurements on a device having no extraneous dissipation is very good, both qualitatively and quantitatively. There also appears on this graph a curve lettered B, which represents the effect of the dissipative material 25 of Fig. 1 free from any action of the conical sidebranches. It will be noted that this curve increases with frequency in the manner to be expected. This curve was obtained by blocking off the open ends of the cones and by filling them with sound absorbent material to deaden any mechanical resonance effect. This added dissipative material was of course not in contact with the sound waves passing along the main channel and produced no attenuating effect. The slight variations in the curve are probably due to residual mechanical resonance which could not be completely damped out.

Curve C of this figure represents measured values of attenuation on the device of Fig. 1. It will be observed that the result is by no means the sum of the effects of the conical sidebranches and the dissipative material. Were the effects merely additive curve C would be a replica of curve A but with higher ordinates, obtained by adding the ordinates of curves A and B. That such is not the case is clearly apparent, there even being some cases, as the points $g$, $h$, and $i$, where the curve C actually has a lower valued ordinate than would be the result of adding the ordinates of the two basic curves. The lowering at these points is not of importance, as in practice the filter shown would be used in combination with some other silencing device, either of the recurrent filter type or of some other kind, which possesses attenuation peaks in these regions as is fully discussed in my prior applications referred to. The interesting thing about the use of dissipative material along the main sound conducting channel in this embodiment of the invention is that the pass bands $a$, $b$, and $c$ have been completely eliminated and the low pass band $f$ has been considerably narrowed. The removal of the narrow pass bands (which as stated above are due to the mechanical construction of the filter in which the length of the main channel between the points of coupling of the sidebranches was greater than the acoustic lengths of the sidebranches and are probably the result of a form of series resonance within the main channel) is of particular utility in that it avoids the necessity for using a separate attenuating device for filling up these pass bands and renders the annular type of channel perfectly satisfactory.

Figs. 5 and 6 show a two section recurrent filter of the type described in my United States Patent 1,910,672 modified by the introduction of sound absorbent material along the main channel. In this case the filter is built into a casing 30 having at its ends headers 31 provided with the usual inlet and outlet connections. Through the center of the device runs a perforated metal tube surrounded by an imperforate tube 33, the space between them being filled with a suitable sound absorbing material 34. Between the casing 30 and the tube 33 is a partition 35 located at the longitudinal center of the device and dividing the space between the casing and the tube into two equal annular sections. The tubes 32 and 33 are cut away to form slots 36 providing a coupling between the main sound conducting channel within the tube 32 and the annular spaces referred to. In accordance with the teaching of my prior patent referred to, and for reasons fully discussed therein, the slots are located at such positions that two sidebranches in parallel are provided, the sidebranch 37 of each section being one-half the length of the sidebranch 38. In this construction it should be noted that the sound absorbing material is exposed to the sound waves passing through the main channel, but not to the sound waves within the sidebranches. The action of the dissipative material in this type of recurrent filter is best described in connection with Fig. 11, which shows a similar type of device modified by the action of a cone.

Fig. 7 shows a mechanical arrangement whereby a body of sound absorbing material distributed uniformly along the main channel of a sound attenuating device may be removed for inspection without disturbing the pipe connections to the silencer. It comprises a generally cylindrical casing 40 having within it, but at one side, a generally cylindrical tube 41 the interior of which forms a part of the main sound conducting channel. Partitions 42 extend between the casing and the tube so as to divide the space between these members into a plurality of similar sidebranches 43 which are acoustically coupled to the main channel by slots 44 formed in the tube 41. As it is generally preferred to have the inlet and outlet connections 45 axially arranged with respect to the casing the latter is extended to form chambers 46 which serve to connect the inlet and outlet connections with the interior of the tube 41. The casing and the tube 41 are provided with a longitudinal opening which is closed by a plate 47 held in place as by studs 48. Secured to this plate is a perforated metal tube 49 the interior of which is filled with sound absorbing material 50. By making the tube 49 of a size permitting its removal through the longitudinal opening referred to the sound absorbing material can be removed as a unit from the device for cleaning or inspection, and access to the interior of the silencing device is also permitted.

Figs. 9 and 10 show a further modification of the same general idea. In this case the main sound conducting channel is centrally disposed within the casing 51, being formed from a tubular member 52 having a cylindrical portion merging into a radial passage extending towards one side of the casing. Partitions 53 separate the space between the casing and the member 52 into a plurality of sidebranches which are acoustically coupled to the main channel by slots 54 in the member 52 similarly to the construction previously described. A generally rectangular perforated metal member 55 is located within the radial passage referred to and contains a suitable sound absorbing material 56. A convenient way of securing the member 55 in place is to mount it on a plate 57 secured by bolts 58 to rails 59 to which the casing and the member 52 may both be welded. In this case also the entire body of sound absorbing material can be removed as a unit from the silencing device without disturbing the inlet and outlet connections.

Fig. 11 shows a further application of the invention which utilizes the same type of filter construction as that shown in Fig. 5 but with a different manner of introducing the sound absorbing material and with a conical sidebranch added. The device comprises a generally cylindrical casing 61 divided by a transverse header 62 into two sections 63 and 64. Section 63 is a two section filter of the general type shown in Fig. 5 and constructed in accordance with my prior Patent 1,910,672. The filter comprises a centrally disposed main sound conducting channel 65 which is extended into section 64 as a partially annular channel 66. Acoustically coupled through slot-like openings in the channel 65 are the two pairs of sidebranches 67, 68. The relative dimensions of the main channel and the sidebranches are shown in Fig. 11 and are described in detail in the patent referred to. The section 64 contains a conical sidebranch 69 of acoustic length $\frac{3}{4}$ L, as shown, which adds its attenuating effect to that of the recurrent filter section 63. Disposed along the length of the channel 65 is a tubular perforate member 70, located centrally within the channel and filled with a sound absorbing material 71. Around the exterior of the cone 69 in section 64 of the device is disposed a body of sound absorbing material 72 confined by a perforate cylindrical member 73. It will thus be seen that the main sound conducting channel 65, 66 through the device is made dissipative by the provision of sound absorbing material, both in the recurrent filter section 63 and in the section 64 enclosing the conical sidebranch.

Fig. 12 shows the actual performance of a device constructed as shown in Fig. 11, both with and without the use of sound absorbing material disposed as shown. Curve D of Fig. 12 shows the amount of attenuation actually obtained over a wide frequency range with no sound absorbing material disposed along the main conducting channel. There is, of course, a certain amount of dissipation introduced due to the viscosity of the gas and to other factors, but as pointed out above, this type of dissipation is relatively slight in effect and produces no advantageous results. The performance of the device with the distributed dissipative material is shown by curve E. As in the case of Fig. 13 previously discussed the effect of the sound absorbing material is not simply additive, for that would result in increasing the ordinates of curve D evenly throughout the spectrum by an amount gradually increasing as the frequency increased, since the intrinsic attenuative effect of dissipation is more marked at the higher frequencies as was indicated by curve B of Fig. 13. That such is not the case is evident from Fig. 13. Series resonance in the main channel probably accounts for the dips in the curve D at points $n$, $o$, and $p$. A very substantial gain in attenuation in each of these regions is produced by the action of the sound absorbing material, a gain which is much greater than the general rise of the attenuation curve. The region $q$ at $$\frac{\omega L}{\pi C}=4$$

is a theoretically wide pass band occurring in the recurrent filter section 63 and partially filled by the action of the conical sidebranch operating at its third harmonic. The dip $m$ is replaced by a peak $r$ due to the fundamental of the cone 69, the attenuating effect of which was largely masked by series resonance in the annular channel 66. It will be seen from the curve as a whole that the device, simple as it is in construction, is raised by the dissipative material to an efficiency corresponding to an attenuation of over forty decibels throughout substantially the entire spectrum, the use of a very small quantity of dissipative material being sufficient to produce a marked effect.

I claim:

1. An acoustic silencing device of the recurrent wave filter type having a main sound conducting channel, a plurality of identical sidebranches acoustically coupled to the main sound conducting channel at intervals along its length, and sound absorbing material distributed along the main sound conducting channel throughout a portion of its length including the portion of the channel between the zones of coupling of the sidebranches.

2. A sound attenuating device comprising a main sound conducting channel, a plurality of closed conical acoustic sidebranches with open bases acoustically coupled thereto at their bases, and sound absorbing material distributed along the main sound conducting channel throughout a portion of its length including the portion of the channel between the zones of coupling of the sidebranches.

3. A sound attenuating device comprising a main sound conducting channel, a plurality of closed conical acoustic sidebranches with open bases acoustically coupled thereto at their bases, the acoustic length of the main channel between the zones of coupling of the sidebranches being slightly greater than the acoustic length of the conical sidebranches, and sound absorbing material distributed along the main sound conducting channel throughout a portion of its length including the portion of the channel between the zones of coupling of the sidebranches in sufficient quantity to substantially eliminate the pass bands due to the difference in acoustic lengths between the main sound conducting channel between said zones of coupling and the conical sidebranches.

4. A sound attenuating device comprising a main sound conducting channel, a plurality of linear sidebranches acoustically coupled to the main sound conducting channel at distances apart substantially equal to the acoustic length of the sidebranches, and sound absorbing material distributed along the main sound conducting channel throughout a portion of its length including the portion of the channel between the zones of coupling of the sidebranches.

5. A sound attenuating device comprising a pair of complete hollow cones nested together with the apex of one at the base of the other, both of said cones being open at their bases, a perforate cylindrical casing extending from the base of one cone to the base of the other, sound absorbing material confined in the space between the cones and said perforate member, and a casing surrounding the cones and defining the outer wall of a main sound conducting channel which is annular in form where it passes around the cones.

6. An acoustic wave filter having an acoustically dissipative main sound and gas conducting channel and closed acoustic sidebranches acoustically coupled thereto at intervals along its length, said sidebranches decreasing in cross sectional area as a function of distance from the point of coupling between said sidebranches and said main sound conducting channel.

7. An acoustic wave filter having a substantially cylindrical casing provided with end inlet and outlet connections, a pair of oppositely facing reflexed conical sidebranches mounted within the casing with their open bases positioned in adjacency to the inlet and outlet connections, a perforated cylindrical casing extending from the base of one reflexed cone to the base of the other, sound absorbing material confined in the space between the cones and said member, the member being spaced from the inside of the casing so as to provide an annular sound conducting channel surrounding the sidebranches.

8. A sound attenuating device comprising a casing, a hollow member extending through the casing and defining a sound conducting channel, partitions extending between the casing and said member to define a plurality of closed sidebranches, openings from said member into the sidebranches, whereby is formed a recurrent acoustic wave filter, and sound absorbing material disposed along the main sound conducting channel between the points of coupling of said channel and the sidebranches.

9. A sound attenuating device comprising a casing, a hollow member extending through the casing and defining a sound conducting channel, partitions extending between the casing and said member to define a plurality of closed sidebranches, openings from said member into the sidebranches, whereby is formed a recurrent acoustic wave filter, the casing and said member having a longitudinally extending opening, a perforate metal container extending into the member through said opening, means for securing said container in place and closing the opening, and sound absorbing material contained within said member.

10. A sound attenuating device comprising a main sound conducting channel, sidebranches acoustically coupled to the channel at points spaced along its length, the channel having a tortuous form between the points of coupling of the sidebranches, and sound absorbing material located so as to be exposed to sound waves within the channel intermediate the points of coupling of the sidebranches to counteract the effect of series resonance within said channel.

11. A composite acoustic wave filter comprising a main sound conducting channel having acoustically coupled thereto, at equal intervals along the length thereof, a pair of closed cylindrical sidebranches in parallel, one of each pair of closed cylindrical sidebranches being twice as long as the other of said pair, each of said pairs being separated along said channel a distance equal to twice the length of the longer of said closed cylindrical sidebranch comprising said pair, and means for rendering the main sound conducting channel acoustically dissipative for a portion of its length including the portion of the channel intermediate the points of coupling of the sidebranches.

12. A composite acoustic wave filter comprising a main sound conducting channel having acoustically coupled thereto, at equal intervals along the length thereof, a pair of closed cylindrical sidebranches in parallel, one of each pair of closed cylindrical sidebranches being twice as long as the other of said pair, each of said pairs being separated along said channel a distance equal to twice the length of the longer of said closed cylindrical sidebranch comprising said pair, and means for rendering the main sound conducting channel acoustically dissipative for a portion of its length including the portion of the channel intermediate the points of coupling of the sidebranches, and a complete closed cone, open at the base, acoustically coupled to said channel at a point along the length thereof beyond that portion of said channel which is in communication with said pairs of closed cylindrical sidebranches, the length of said complete closed cone being three quarters of the length of said main sound conducting channel between said pairs of closed cylindrical sidebranches.

13. A sound attenuating device comprising a conduit having inlet and outlet connections and forming a main sound and gas conducting channel, a plurality of closed acoustic sidebranches acoustically coupled to said channel, a container with perforate walls, sound absorbing material within said container, and means for removably securing said container within the main channel.

14. A sound attenuating device comprising a conduit having inlet and outlet connections and forming a main sound and gas conducting channel, a plurality of closed acoustic sidebranches acoustically coupled to said channel, a container with perforate walls, sound absorbing material within said container, and means for securing the container removably in a position in which it projects laterally into said channel, whereby the container with the sound absorbing material therein may be removed from the main channel without disturbing said inlet and outlet connections.

ROLAND B. BOURNE.